(12) United States Patent
Singh et al.

(10) Patent No.: US 11,971,169 B2
(45) Date of Patent: Apr. 30, 2024

(54) GLOW PLUG FOR A FUEL CELL SYSTEM

(71) Applicant: BLOOM ENERGY CORPORATION, San Jose, CA (US)

(72) Inventors: Vivek Kumar Singh, San Jose, CA (US); Siddharth Patel, San Jose, CA (US); Mike Petrucha, San Jose, CA (US); Nick Arcelona, San Jose, CA (US); Junyi Lee, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/048,582

(22) Filed: Oct. 21, 2022

(65) Prior Publication Data

US 2023/0130709 A1 Apr. 27, 2023

Related U.S. Application Data

(63) Continuation of application No. 17/965,334, filed on Oct. 13, 2022.

(30) Foreign Application Priority Data

Oct. 22, 2021 (IN) .............................. 202141048332

(51) Int. Cl.
*F23Q 7/22* (2006.01)
*H01M 8/04007* (2016.01)
(Continued)

(52) U.S. Cl.
CPC .......... *F23Q 7/22* (2013.01); *H01M 8/04037* (2013.01); *H01M 8/1246* (2013.01); *H05B 3/06* (2013.01);
(Continued)

(58) Field of Classification Search
None
See application file for complete search history.

(56) References Cited

U.S. PATENT DOCUMENTS 4,475,029 A * 10/1984 Yoshida .................. F23Q 7/001
361/266
5,998,765 A * 12/1999 Mizuno .................... H05B 3/48
219/544

(Continued)

FOREIGN PATENT DOCUMENTS

CN 111075614 A * 4/2020 ........... F02M 31/125
CN 111075614 A 4/2020
(Continued)

OTHER PUBLICATIONS

CN-111075614-A, Bib data sheet, Apr. 2020 (Year: 2020).*
CN-111075614-A, partial translation, Apr. 2020 (Year: 2020).*

*Primary Examiner* — Joseph M. Pelham
(74) *Attorney, Agent, or Firm* — Evergreen Valley Law Group; Kanika Radhakrishnan

(57) ABSTRACT

Various embodiments disclose a glow plug for a solid oxide fuel cell system. The glow plug includes a housing having a first end portion and a second end portion. The glow plug includes a heating element longitudinally disposed in the housing, extending from the second end portion of the housing towards the first end portion and extending outwardly from the housing for igniting fuel. Further, the glow plug includes a pair of coiled wires electrically connected to the heating element. Further, the glow plug includes a potting compound disposed within the second end portion of the housing for securing electrical coupling of the pair of coiled wires with the heating element. Furthermore, the glow plug includes a sealing element configured to form an
(Continued)

air-tight connection between the housing and the heating element. The sealing element is positioned on top of the potting compound.

5 Claims, 16 Drawing Sheets

(51) Int. Cl.
*H01M 8/1246* (2016.01)
*H05B 3/03* (2006.01)
*H05B 3/04* (2006.01)
*H05B 3/06* (2006.01)
*H05B 3/10* (2006.01)
*H01M 8/12* (2016.01)

(52) U.S. Cl.
CPC ....... *H05B 3/10* (2013.01); *H01M 2008/1293* (2013.01); *H05B 2203/027* (2013.01)

(56) References Cited

U.S. PATENT DOCUMENTS

| | | | |
|---|---|---|---|
| 8,563,180 B2 | 10/2013 | Perry et al. | |
| 9,644,842 B2* | 5/2017 | Harada | F02P 19/00 |
| 2008/0095943 A1 | 4/2008 | May et al. | |
| 2012/0175405 A1* | 7/2012 | England | H01M 8/0618 |
| | | | 228/124.1 |
| 2015/0288006 A1* | 10/2015 | Arcelona | H01M 8/04037 |
| | | | 429/535 |
| 2019/0081334 A1* | 3/2019 | Patel | H01M 8/04022 |
| 2019/0214660 A1* | 7/2019 | Pratap | H01M 8/0631 |
| 2023/0130672 A1* | 4/2023 | Singh | H05B 3/10 |
| | | | 219/542 |

FOREIGN PATENT DOCUMENTS

EP 0843131 A2 5/1998
WO WO-2015014844 A1 * 2/2015 ............. F23Q 7/001

* cited by examiner

GLOW PLUG FOR A FUEL CELL SYSTEM

TECHNICAL FIELD

The present invention is directed to fuel cell systems and, more specifically, to a glow plug for a solid oxide fuel cell (SOFC) system.

BACKGROUND

Fuel cells, such as solid oxide fuel cells, are electrochemical devices that can convert energy stored in fuels to electrical energy with high efficiencies. High-temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

A fuel cell includes a glow plug to ignite the fuel. Present glow plugs are primarily designed for automobiles. The current glow plugs are mainly intended to ignite the fuel in automobiles. However, most of the commercial glow plugs are single electrode systems. While in the SOFC system, the glow plug body should be perfectly insulated from heating elements.

There exists a technological need to design a glow plug for a high-temperature application with a longer design life.

SUMMARY

Various embodiments relate to a glow plug for a solid oxide fuel cell (SOFC) system. The glow plug includes a housing that has a first end portion and a second end portion. The glow plug further includes a heating element longitudinally disposed in the housing, extending from the second end portion of the housing towards the first end portion and extending outwardly from the housing for igniting fuel. Further, the glow plug includes a pair of coiled wires electrically connected to the heating element. The pair of coiled wires extends from the second end portion of the housing. Further, the glow plug includes a potting compound disposed within the second end portion of the housing for securing electrical coupling of the pair of coiled wires with the heating element. Furthermore, the glow plug includes a sealing element configured to form an air-tight connection between the housing and the heating element. The sealing element is positioned on top of the potting compound.

BRIEF DESCRIPTION OF THE DRAWINGS

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers.

Figure 1A:
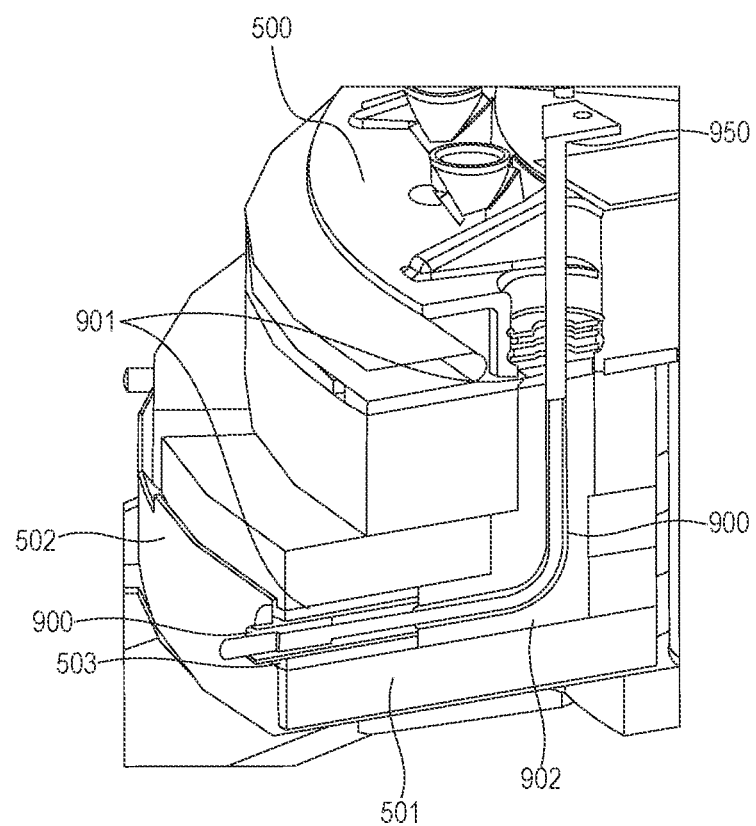
FIG. 1A is a three-dimensional cut-away view illustrating the base portion of a SOFC system according to a comparative example of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein.

Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

To maintain high operating efficiency, the desired temperature of the fuel cells should be maintained throughout the operation. However, gaps within layers in the fuel cell hot box and instrumentation feed-through holes may introduce significant heat leaks, resulting in undesired temperature variation. Additionally, high-temperature operation and variations in temperatures may cause stress and damage to fuel cell components.

Components such as glow plugs may be inserted through feed-through holes. Glow plugs are fuel cell components having a heating element that provides heat for maintaining SOFC operation. Glow plugs are typically inserted into the reaction chamber, often contained within a housing of a glow plug assembly. Because glow plugs are provided into SOFC reaction chambers through feed-through holes, the glow plugs or heating elements that are inserted into the reaction chambers should be sealed to prevent leaks that may occur between the element and the housing that supports the element and facilitates insertion. Further, components in or near the reaction chambers may be exposed to extreme operating temperatures and extreme variations of temperature. Because of extreme temperature conditions and variations, differences in coefficients of thermal expansion (CTEs) between housing components and heating elements may cause stresses leading to micro-crack formation in the heating elements, which may shorten the life of the heating elements, may give rise to leaks and may reduce the operational reliability and longevity of the SOFC.

Embodiments of the present invention are drawn to solid oxide fuel cell (SOFC) systems and methods of sealing a glow plug and/or glow plug assembly, to provide resilience to temperature cycles or fluctuations during operation of high-temperature SOFC systems and reduce glow plug failure. Further, by maintaining stable temperatures during the operation of high-temperature SOFC systems using insulation as disclosed herein, both the thermal efficiency and the electrical efficiency may be improved, and the possibility of glow plug failure may be reduced in these systems. Embodiments may optionally be drawn to a SOFC system that includes a pourable insulation material to improve thermal efficiency. One type of pourable insulation material may be a "free flow" insulation which is a fluid that can be poured into an opening in the SOFC housing but solidifies into a high-temperature resistant material when cured. Alternatively, the pourable insulation material is a flowable insulation material that does not need to be cured. One method of insulating the base portion of a high-temperature fuel cell system is disclosed in U.S. patent application Ser. No. 13/344,304, filed on Jan. 5, 2012, and hereby incorporated by reference in its entirety. The result of this method is illustrated in FIG. 1A. The fuel cell stacks (not shown) are positioned on a stack support base 500 which is located over a base pan 502 filled with base insulation 501. The stack support base 500 contains a bridging tube 900 that eliminates the need for one of the seal elements. The bridging tube 900 may be made of an electrically insulating material, such as a ceramic, or it may be made of a conductive material that is joined to a ceramic tube outside the base pan 502. The use of a bridging tube 900 eliminates an air leak path. The current collector/electrical terminal 950 from the stacks is routed in the bridging tube 900 from top of the stack support base 500, through a base insulation 501 made of a microporous board, and out of the base pan 502. A sheet metal retainer 503 may be used to fix the bridging tube 900 to the base pan 502. In embodiments to be described in further detail hereinbelow, similar configurations may be used to provide an insertion point and routing for electrical wiring for a glow plug. In an embodiment in which a glow plug is inserted, the electrical wiring may extend from the external side of the glow plug through the sidewall 330 of the outer housing 300 of the hotbox, or through the base pan 502.

The bridging tube 900 may be insulated in the base with super wool 901 and/or a pourable insulation material 902. The pourable insulation material 902 may be the "free flow" insulation, which is poured into an opening in the stack support base 500 around the bridging tube 900 and then solidifies into a high-temperature resistant material when cured. The pourable insulation material 902 fills less than 10 volume % of the base cavity around the bridging tube 900. In an alternative embodiment, the pourable insulation material 902 is made of dry solid granular particles. Conduits for a glow plug assembly and electrical connections to the glow plug assembly may also be insulated in the manner described, to reduce thermal variations and thermal exposure to the glow plug elements.

Figure 1B:
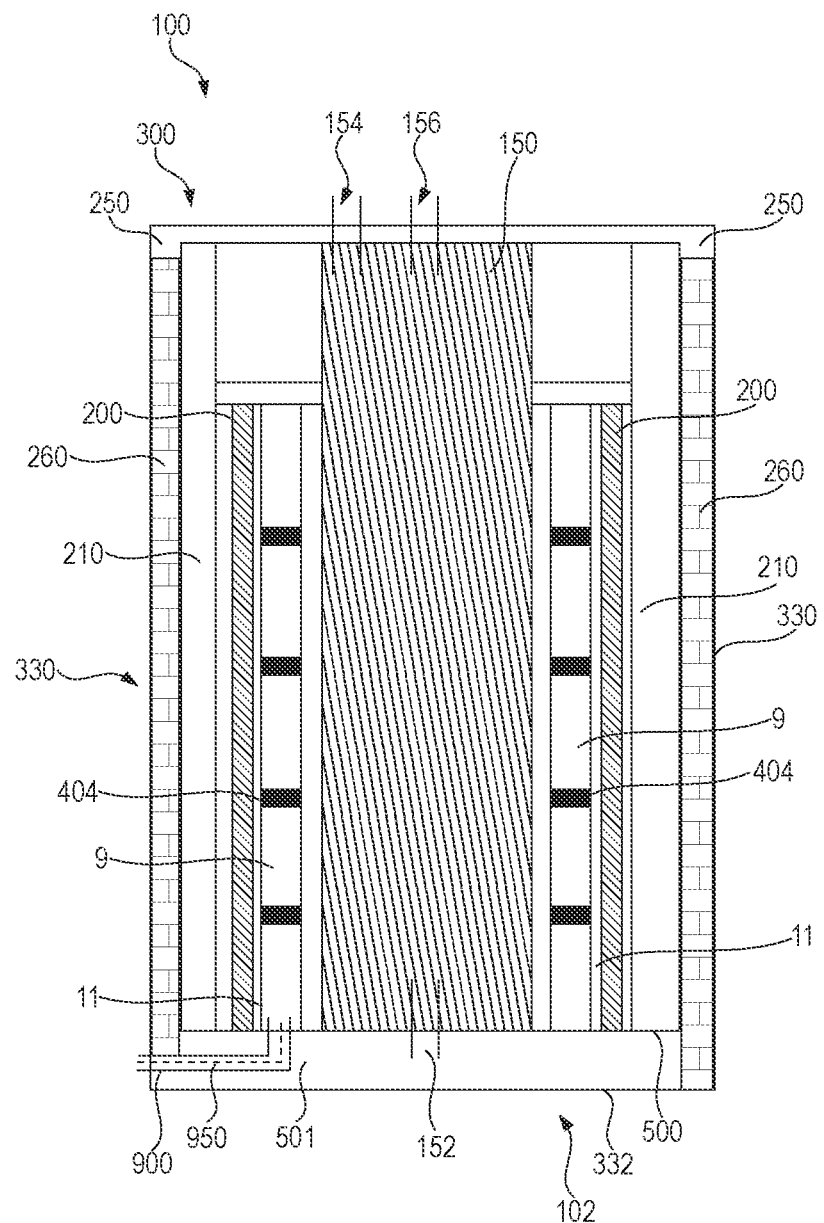
FIG. 1B is a schematic illustration of a cross-section of the SOFC system according to an exemplary embodiment of the present disclosure.

FIG. 1B is a cross-section illustrating a first embodiment of a SOFC system 100. The SOFC system 100 includes one or more columns 11 of fuel cell stacks 9 located on the stack support base/a base plate 500. Each fuel cell stack includes one or more fuel cells as described in the U.S. patent application Ser. No. 13/344,304, hereby incorporated by reference in its entirety. Fuel manifolds 404 may be located between the fuel cell stacks 9 in the columns 11. The columns 11 of fuel cell stacks 9 may be located on a base plate 500 and arrayed about a central plenum 150. The central plenum 150 may include the various balance of plant components, such as a reformer and/or heat exchanger, such as an anode cooler heat exchanger and/or an anode exhaust gas recuperator (not shown). The central plenum 150 of the SOFC system 100 also includes a fuel input conduit 152, an oxidant input conduit 154, and a fuel/oxidant exhaust output conduit 156 (e.g., anode tail gas oxidizer output including fuel exhaust oxidized by the oxidant exhaust).

The SOFC system 100 also includes a cathode recuperator 200 located about an outer periphery of the columns 11 of fuel cell stacks 9. To insulate the SOFC system 100 from heat loss, a resilient insulating layer 210 may be provided in the gap between the cathode recuperator 200 and the sidewall 330 of the outer housing 300 (e.g. hot box) of the SOFC system 100. To further insulate the SOFC system 100, a compliant insulating layer 260 may be provided in gap 250 between the resilient insulating layer 210 and the sidewall 330 of the outer housing 300 of the SOFC system 100. The resilient insulating layer 210 may be made of any suitable thermally insulating resilient material, such as a pourable material, e.g., a free flow material or a solid granular material. The compliant insulating layer 260 may be made of any suitable material, such as thermally resistant felt, paper, or wool. As used herein, a "compliant" material is a material that compresses and expands by at least 10 volume percent without damage. The base cavity 102 (also illustrated in FIG. 3), which is at least partially defined by stack support base 500, the bottom wall 332 of the base pan 502 of the outer housing 300, and the sidewall 330 of the outer housing 300, may be filled with a base insulation 901, such as a microporous board 501, a pourable insulation material 902, or a combination thereof, as discussed in more detail below. In an exemplary embodiment, the microporous board 501 fills one quarter or less of the volume of the base cavity 102 of the outer housing 300.

Heat fluctuations during operation of the SOFC may cause the thin outer housing 300 (e.g. a metal housing) to expand and contract more rapidly than the more massive internal components of the SOFC system (e.g., stacks). This, in turn, may result in fatigue and damage to the insulation shell/containment and/or to the outer housing 300 and/or to the cathode recuperator. Further, absent a compliant insulating layer 260 in the gap 250 between the resilient insulating layer 210 and the sidewall of the outer housing 300, a gap may be generated that is large enough to allow the compression-resistant (i.e., resilient) pourable resilient insulating layer 210 to escape the SOFC system if the sidewall 330 of the outer housing 300 expands faster than the internal components of the SOFC system. However, the addition of a compliant insulating layer 260 in the gap 250 between the resilient insulating layer 210 and the sidewall of the outer housing 300 absorbs the stresses caused by expansion of the internal components of the SOFC system, thereby protecting the outer housing 300, the cathode recuperator 200, the resilient insulating layer 210 and/or the compliant insulating layer 260 expands to fill any gaps formed if the outer housing 300 expands faster than the internal components of the SOFC system. In other embodiments, at least 30 vol. %, such as at least 50%, e.g., 30-100 vol. %, e.g. 50-75 vol. % of the base cavity is filled with pourable insulation.

Figure 2:
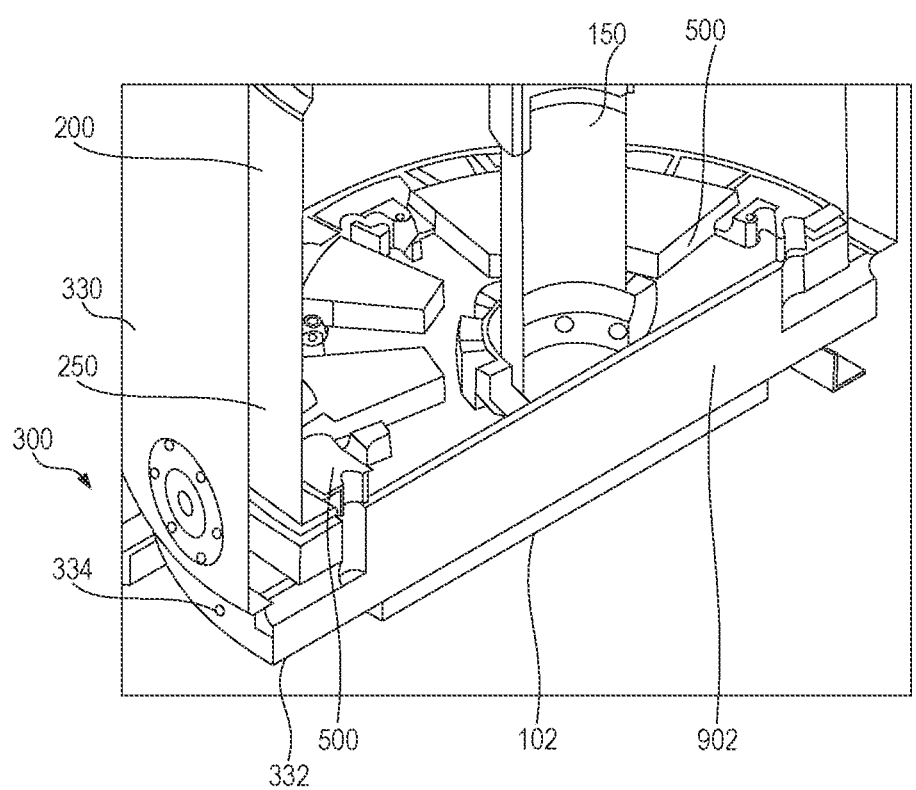
FIG. 2 is a three-dimensional cut-away view illustrating the base portion of the SOFC system according to another exemplary embodiment of the present disclosure.

FIG. 2 illustrates another exemplary embodiment of a SOFC system. In this embodiment, the base cavity 102 in the base pan 502 below the stack support base 500 is filled with a pourable insulation material 902. The pourable insulation material 902 may be "self-healing", in that it flows around tubing (e.g. bridging tube 900) or instrumentation that is inserted into the base of the SOFC hot box. In this manner, the pourable insulation material 902 prevents leaks due to feed-through holes made to introduce tubing or instrumentation into the SOFC. In an exemplary embodiment, a cavity between the side insulation (e.g. layers 210 and/or 260) and the base is accessed to fill the base cavity 102 with the pourable insulation material 902 in a single step. In an exemplary embodiment, the resilient insulating layer 210 is made of the same material as the pourable insulation material 902 and is formed in one filling step, after forming the compliant insulating layer 260. The pourable insulation material 902 may be supplied to the base cavity 102 via an opening 334 in the sidewall 330 of the outer housing 300 of the system (e.g. opening 334 in the base pan 502).

Figure 3:
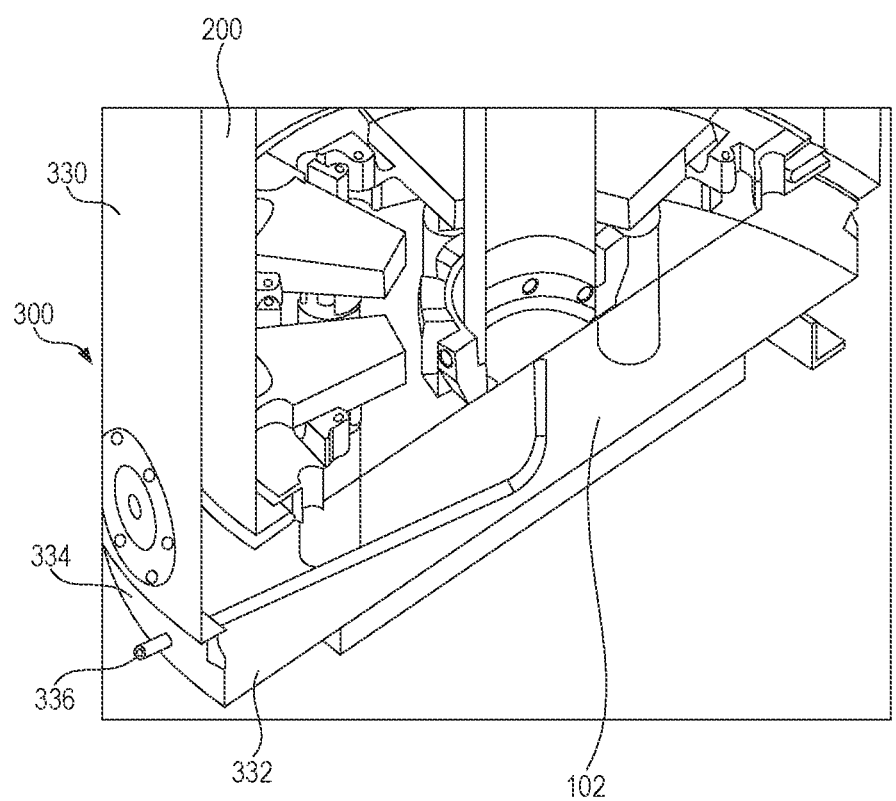
FIG. 3 is a three-dimensional cut-away view illustrating the base portion of the SOFC system according to another exemplary embodiment of the present disclosure.

FIG. 3 illustrates another exemplary embodiment of a method to fill the base cavity with pourable insulation material. One end of a fill tube 336 extends out of the outer housing 300 through the opening 334 in the sidewall 330 of the outer housing 300. The other end is located in the base cavity 102 near a top portion of the base cavity 102. For example, the other end may be disposed near a central portion of the base cavity 102 (i.e. under the central plenum 150). In this embodiment, a vacuum may be applied to the fill tube 336 to aid with filling the base cavity 102 with the pourable insulation material 902, for example, through the gap between the cathode recuperator 200 and the outer housing 300.

Figure 4:
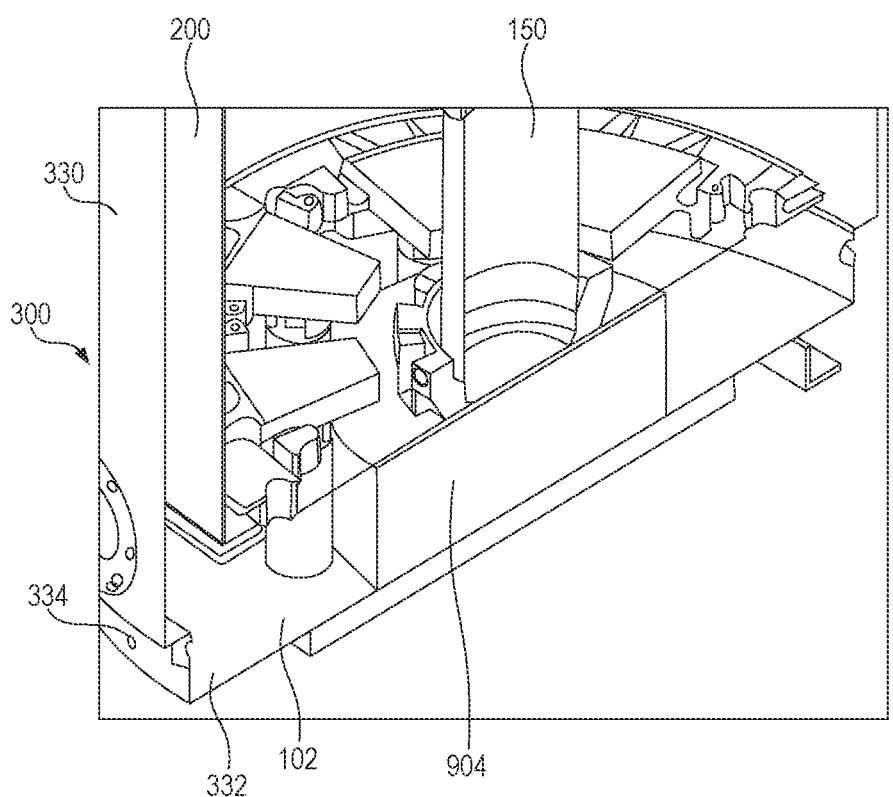
FIG. 4 is a three-dimensional cut-away view illustrating the base portion of the SOFC system according to various embodiments of the present disclosure.

Another exemplary embodiment is illustrated in FIG. 4. In this embodiment, a central portion of the base cavity 102 is filled with solid insulation material, such as a microporous board 904. The remainder of the base cavity 102 is filled with the pourable insulation material 902.

Figure 5:
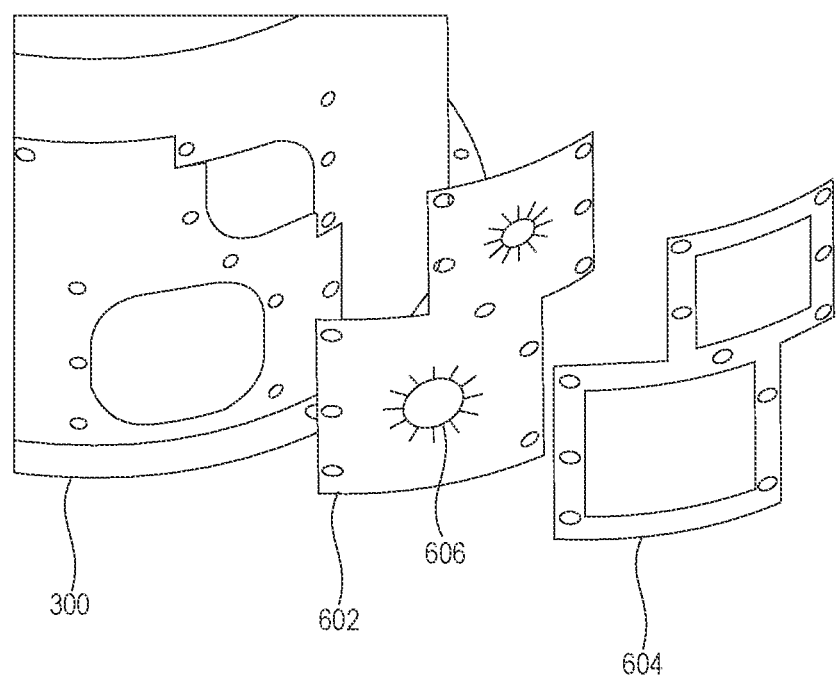
FIG. 5 is an exploded view of a gasket and a frame of the SOFC system according to various embodiments of the present disclosure.

FIG. 5 illustrates another exemplary embodiment. In this embodiment, a gasket 602 and a frame 604 are provided to assist in sealing of plumbing, such as a fuel input or oxidant input pipes or conduits, bridging tube 900, and/or instrumentation penetrations through the outer housing 300, including openings for glow plug insertion and accompanying wiring. The gasket 602 made be made of any suitable material, such as silicon-coated fiberglass. The fiberglass provides high-temperature resistance, while the silicon coating restrains the fine particles of pourable insulation material 902 from flowing out of the base cavity 102. In some embodiments, the gasket 602 is made of a flexible material and can stretch slightly to accommodate expansion and contraction of the sidewall 330 of the outer housing 300, during the operation of the SOFC system.

The frame 604 may be provided to secure the gasket 602 to the sidewall 330 of the outer housing 300 (e.g. to the sidewall of the base pan 502 portion of the outer housing 300). For example, the gasket 602 may be disposed between the frame 604 and the sidewall 330, while bolting the frame 604 to the sidewall 330. Instrumentation including, for example, the glow plug or heating element and associated wiring, (thermocouples, etc.), pipes, tubes, etc. pass through openings 606 in the gasket(s) 602.

Figure 6A:
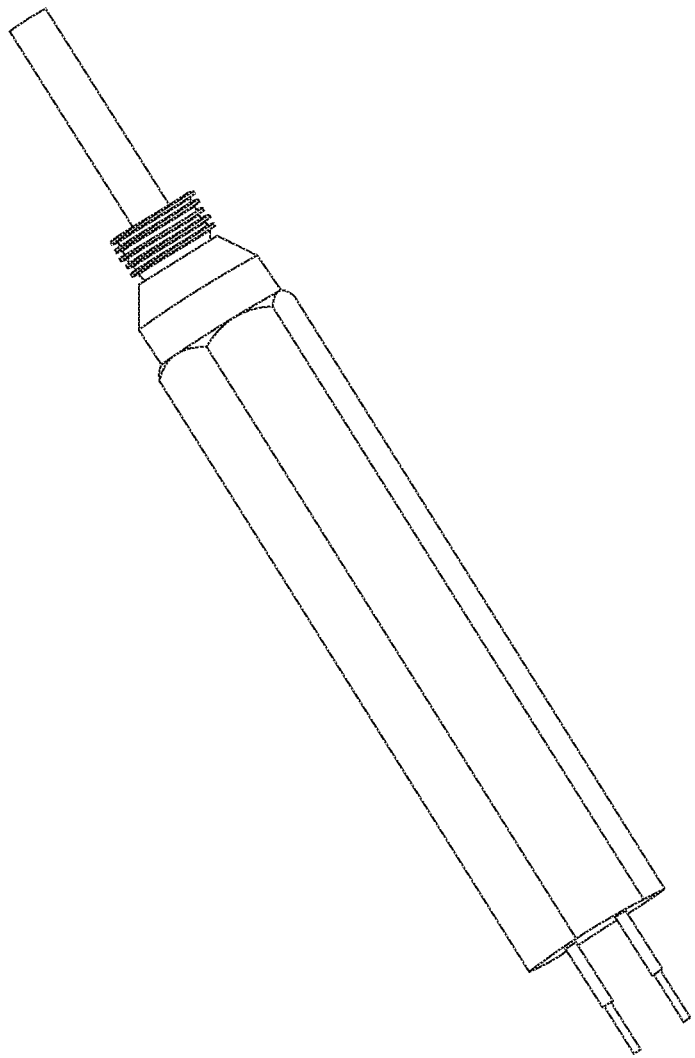
FIG. 6A depicts a glow plug of the SOFC system, in accordance with an embodiment of the present disclosure.
Figure 6A:

FIG. 6A depicts a glow plug 600 of a SOFC system, in accordance with an embodiment of the present disclosure. The glow plug 600 is uniquely designed to sustain high temperatures close to 900° C. throughout its useful life without any leakage of reactive gases around the glowing tip.

Figure 6B:
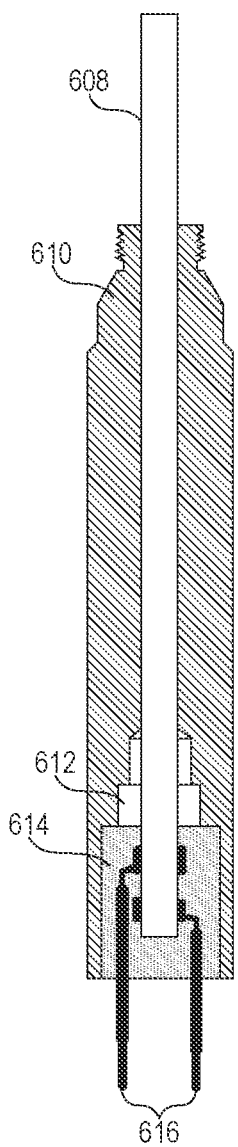
FIG. 6B illustrates elements of the glow plug, in accordance with an embodiment of the present disclosure.

FIG. 6B illustrates elements of a glow plug (will be referred to as glow plug 600), in accordance with an embodiment of the present disclosure. The glow plug 600 includes a heating element 608, a housing 610, a sealant or a sealing element 612, an insulator potting compound 614, and a pair of terminal coiled wires 616.

The heating element 608 may include a working end and an opposing electrical coupling end. The heating element 608 extends from the housing 610. The working end of the heating element 608 may be inserted into a reaction chamber of the SOFC and interact with fuel in the reaction chamber to promote combustion. The heating element 608 has a glowing tip (i.e., the glow plug tip) referred to as a ceramic heater. The glowing tip is stable in oxidizing as well as in reducing environments at high temperatures. The ceramic heater is enclosed in a silicon nitride body (i.e., the heating element 608). During the operation of the glow plug 600, a sufficient amount of heat will be released from the glow plug tip to initiate and sustain the catalytic reaction in the SOFC system. The heating element 608 is installed in the housing 610 that is made of Inconel alloy and the front end of the housing 610 is close to the glowing tip. Further, the glow plug tip is exposed to a temperature of around 900° C. The heat will be conducted from the front end to the back end of the glow plug 600. The temperature at the back end of the glow plug 600 will be around 30-40% of the front end of the glow plug 600 for a long body (such as 100 mm) of the glow plug 600. A longer heating element 608 is chosen to reduce the temperature distribution at the back end of the glow plug 600. The glow plug 600 should be hermetic from room temperature to 1000° C. The heating element 608 may be cylindrical. The heating element 608 is brazed with the pair of terminal coiled wires 616 at the opposing electrical coupling end. The heating element 608 includes current-carrying conductors present inside. The heating element 608 is made of silicon nitride which provides excellent dielectric strength up to 500 VDC.

The housing 610 has a front end portion and a back end portion. The heating element 608 is positioned in the housing 610 and the working end of the heating element 608 protrudes outside from the front end portion. The housing 610 encloses the sealing element 612, the insulator potting compound 614, and an electrical connection of the heating element 608 with the pair of terminal coiled wires 616. The pair of terminal coiled wires 616 protrude from the back end portion of the housing 610. The housing 610 may be made of Inconel superalloy. Inconel is a family of austenitic nickel-chromium-based superalloys. The housing 610 provides excellent insulation resistance at rated operating power.

The sealing element 612 (will be referred to as sealant 612) is placed inside the housing 610 near the back end portion to make the glow plug 600 hermetic for a range of temperatures. The sealant 612 is placed at the back end of the glow plug to reduce the temperature distribution around the sealant 612. The sealant 612 is located approximately at 70 mm from the front end of the glow plug 600 such that the temperature distribution of the sealant 612 will be in the range of 30-40% of the temperature at the front end of the glow plug 600. The sealant 612 is a ring-like structure that has an inner diameter (ID) and an outer diameter (OD). Further, the sealant 612 is brazed to the housing 610 on the OD side and the sealant 612 is brazed to the heating element 608 on the ID side. An advantage of placing the sealant 612 at the back end is that the sealant 612 will not be directly exposed to reactive gases and oxidizing environment. This results in negligible high-temperature corrosion of the sealant 612 and the brazing. The hermeticity of glow plug 600 will be sustained throughout its design.

The insulator potting compound 614 (hereinafter referred to as potting compound) is placed below the sealant 612. The surrounding area near the brazing of the pair of terminal coiled wires 616 is filled with the potting compound 614 made of alumina. The potting compound 614 is configured to protect the movement of the pair of terminal coiled wires 616 during the installation and the uninstallation of the glow plug 600. The potting compound 614 acts as an insulator for the pair of terminal coiled wires near a coil wire-conductor brazing interface. Further, the potting compound 614 is configured to bond with the housing 610 and the heating element 608. The potting compound 614 further adds to the hermeticity of the glow plug 600. The pair of terminal coiled wires 616 is covered with fiberglass sheath to avoid any shortage with the housing 610.

The pair of terminal coiled wires 616 is coupled to the electrical coupling end of the heating element 608. The pair of terminal coiled wires 616 is a solid Nickel (Ni) wire that is brazed to the heating element 608 at the electrical coupling end.

Figure 6C:
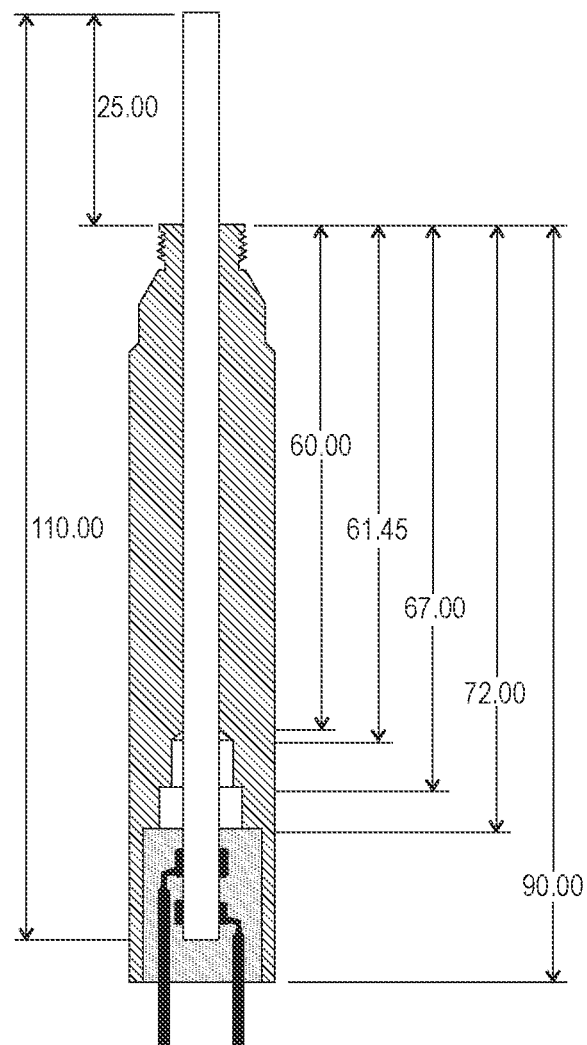
FIG. 6C depicts an illustration of the glow plug with physical measurements (in mm) of the elements, in accordance with an embodiment of the present disclosure.

FIG. 6C depicts an illustration of a glow plug 600 (shown in FIGS. 6A and 6B) with physical measurements (in mm) of the elements, in accordance with an embodiment of the present disclosure. In an example embodiment, the heating element 608 is made of ceramic and the housing 610 of the glow plug 600 is made of Inconel superalloy. The sealant 612 is made of non-oxide ceramics that are joined by a glass seal on the OD side with the brazing on the ID side. The potting compound 614 is made of zirconia and alumina-based ceramics which are bonded with the housing 610 and the heating element 608. The pair of terminal coiled wires 616 has been brazed to the heating element 608. The pair of terminal coiled wires 616 is solid Ni wires.

Figure 6D:
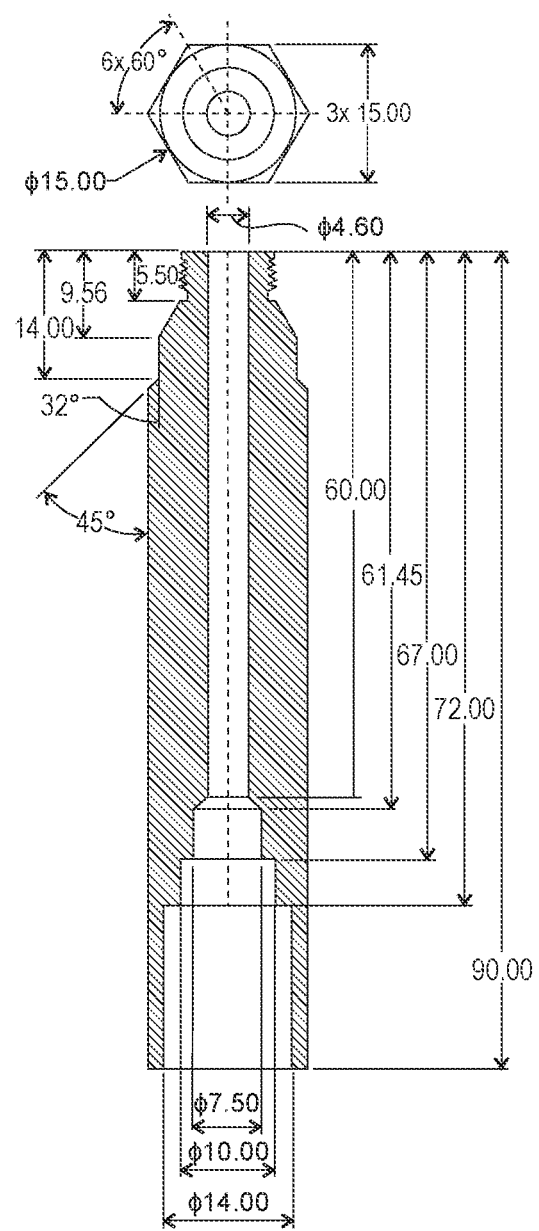
FIG. 6D illustrates internal geometry details of the glow plug, in accordance with an embodiment of the present disclosure.

FIG. 6D illustrates internal geometry details of a glow plug (similar to the glow plug 600 shown in 6A-6C), in accordance with an embodiment of the present disclosure. In an example embodiment, the internal features of the glow plug are uniquely designed to assemble all the sub-components (such as the sealant, an insulation ring, an insulation ceramic sleeve, the heating element, potting compound, and the pair of terminal coiled wires). The shape of the housing is hexagonal to facilitate the easy installation and uninstallation of glow plugs into the SOFC system. Also, a hexagonal of a bigger diameter ensures enough clearance between the pair of the terminal coiled wires and the housing at the back end. The housing includes a central cylindrical hole throughout in the middle of the body along the longitudinal axis to accommodate the heating element. The housing has three cylindrical holes of 7.5 mm, 10.0 mm, and 14.0 mm diameter made at the back end about a longitudinal axis to accommodate an angled ceramic, the sealant, and the potting compound respectively. The locations of these holes are optimized to maintain a temperature range of 30-40% of the front end temperature during the operation of the glow plug in the SOFC system. Further, a thread has been made at the front end of the housing to position the glow plug inside the SOFC system.

Figures 7A, 7B, 7C, 7D:
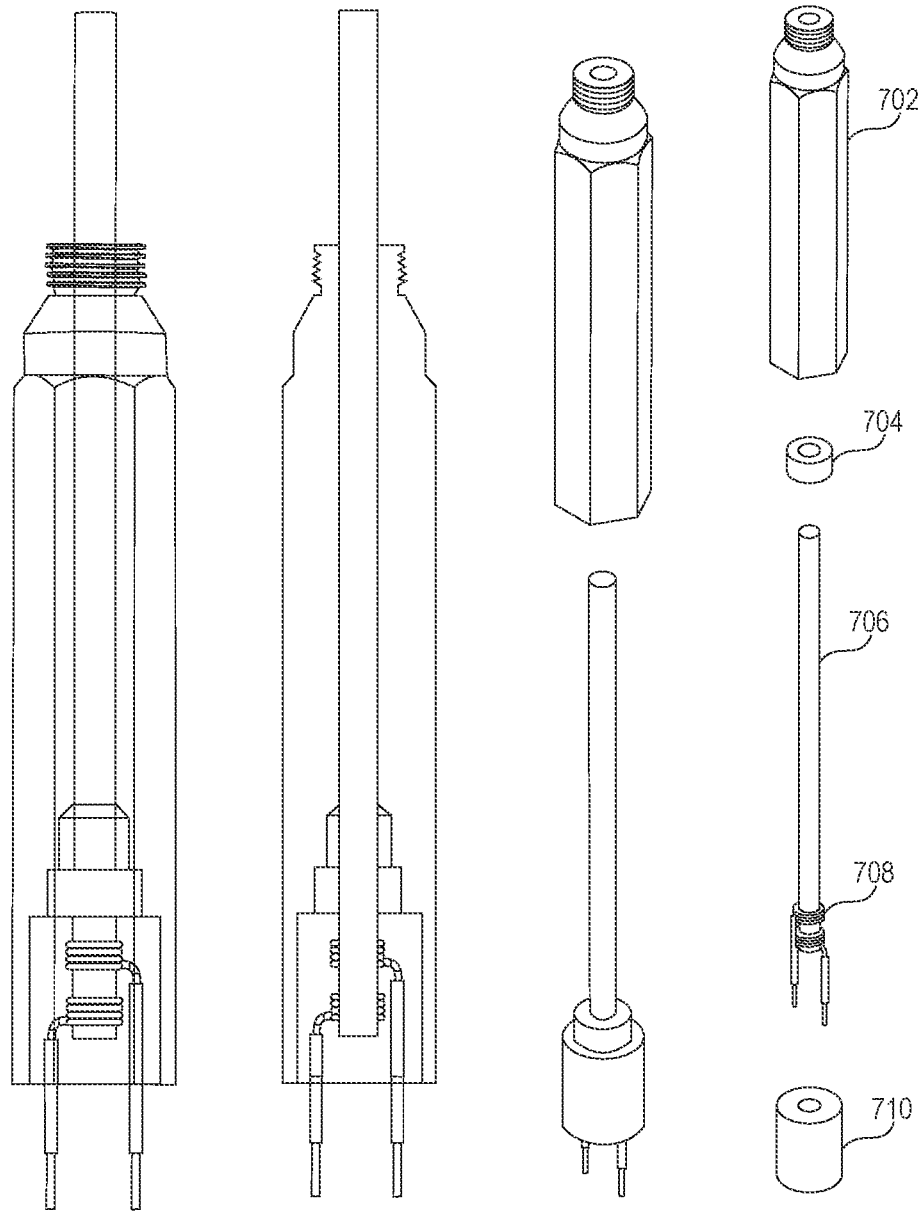
FIGS. 7A-7D illustrate different element views of the glow plug, in accordance with an embodiment of the present disclosure.

FIGS. 7A-7D illustrate different element views of a glow plug (similar to the glow plug shown in FIG. 6B), in accordance with an embodiment of the present disclosure. FIG. 7D illustrates all element exploded view inside the glow plug shown in FIG. 6B. FIG. 7D depicts a housing 702, a sealing element 704, a heating element 706, and a potting compound 710 that are similar to the housing 610, the sealing element 612, the heating element 608, and the potting compound 614 of FIG. 6B, respectively. Further, FIG. 7D depicts an electrical connection 708 between a pair of terminal coiled wires and the heating element 706.

Figures 8A, 8B:
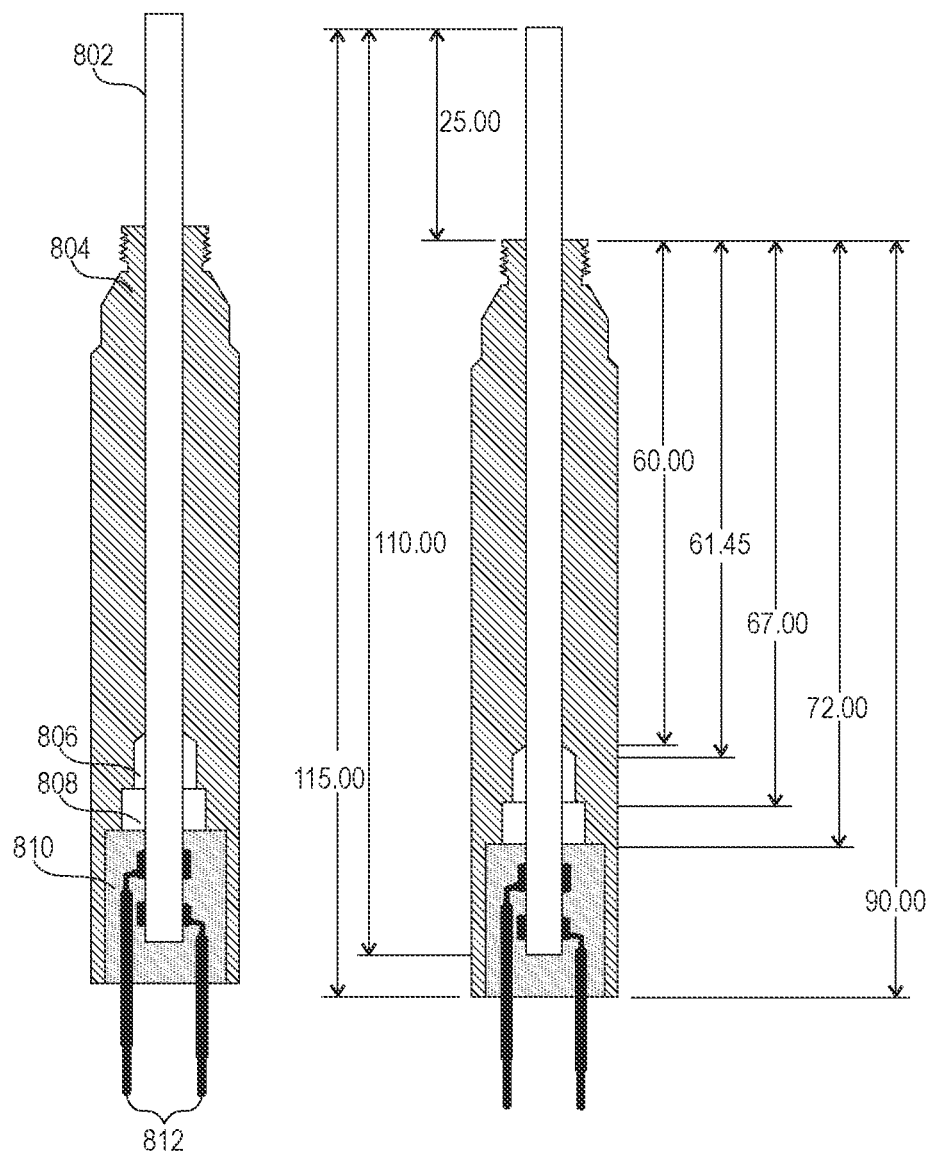
FIG. 8A illustrates elements of another glow plug, in accordance with an embodiment of the present disclosure.
FIG. 8B depicts an illustration of the glow plug with physical measurements (in mm) of the elements, in accordance with an embodiment of the present disclosure.

FIG. 8A illustrates elements of another glow plug, in accordance with an embodiment of the present disclosure. The glow plug, shown in FIG. 8A, is similar to the glow plug shown in FIG. 6B. The glow plug, shown in FIG. 8A, includes a pair of terminal coiled wires 812 that is similar to the pair of terminal coiled wires 616 shown in FIG. 6B. The glow plug in FIG. 8A includes an angled sleeve 806 in addition to the elements of the glow plug 600. The angled sleeve 806 is made of oxide ceramics which will be joined by a glass seal on the OD side. Other components and working of the glow plug in FIG. 8A remain the same as that of the glow plug 600, and hence the corresponding description is omitted for the sake of brevity. FIG. 8B depicts an illustration of a glow plug (shown in FIG. 8A) with physical measurements (in mm) of the elements, in accordance with an embodiment of the present disclosure.

Figures 9A, 9B, 9C, 9D:
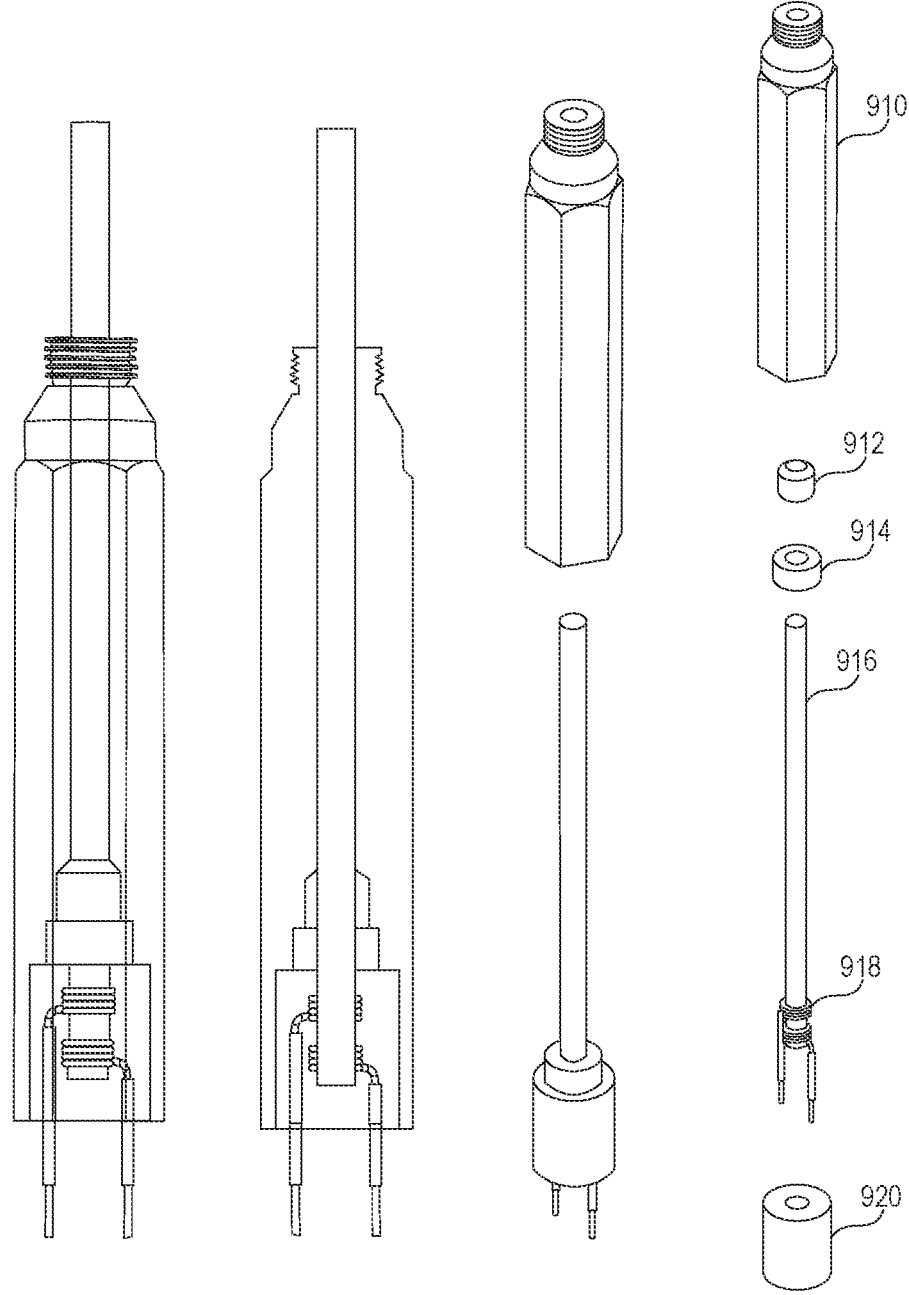
FIGS. 9A-9D illustrate different element views of the glow plug, in accordance with an embodiment of the present disclosure.

FIGS. 9A-9D illustrate different element views of a glow plug (similar to the glow plug shown in FIG. 8A), in accordance with an embodiment of the present disclosure. FIG. 9D illustrates all element exploded view inside the glow plug shown in FIG. 8A. FIG. 9D depicts a housing 910, an angled sleeve 912, a sealing element 914, a heating element 916, and a potting compound 920 that are similar to a housing 804, an angled sleeve 806, a sealing element 808, a heating element 802, and a potting compound 810 of FIG. 8A, respectively. Further, FIG. 9D depicts an electrical connection 918 between a pair of terminal coiled wires and the heating element 916.

Figure 10A:
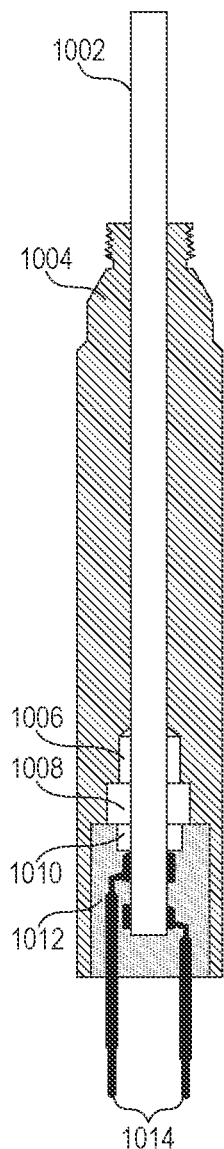
FIG. 10A illustrates elements of another glow plug, in accordance with an embodiment of the present disclosure.
Figure 10B:
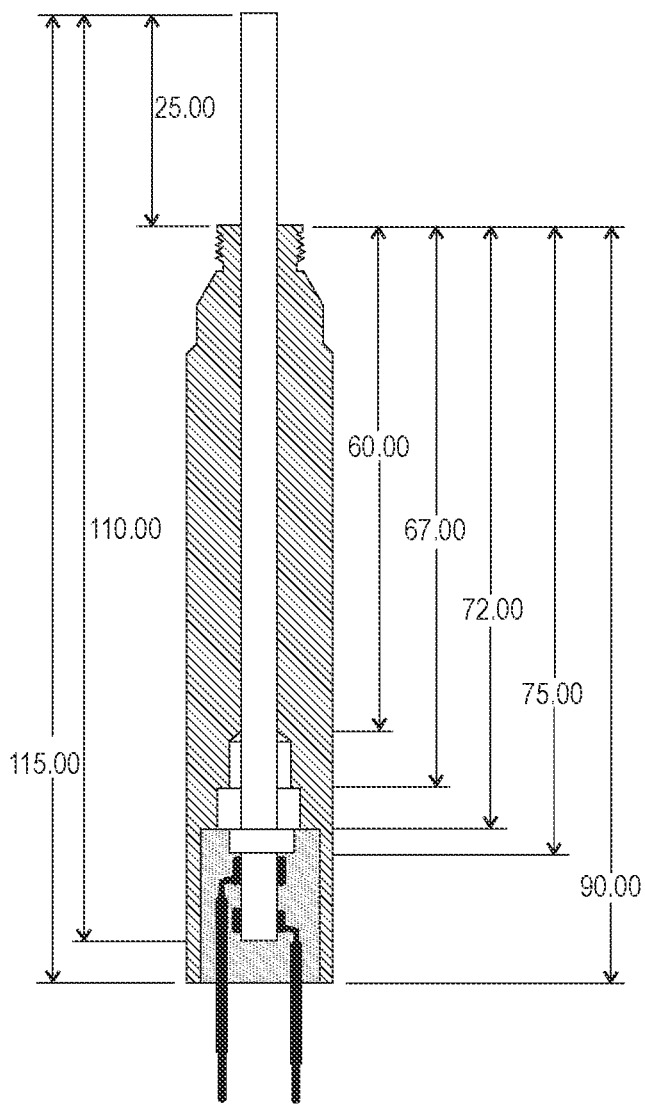
FIG. 10B depicts an illustration of the glow plug with physical measurements (in mm) of the elements, in accordance with an embodiment of the present disclosure.

FIG. 10A illustrates elements of another glow plug, in accordance with an embodiment of the present disclosure. The glow plug, shown in FIG. 10A, is similar to the glow plug shown in FIG. 6B. The glow plug, shown in FIG. 10A, includes a pair of terminal coiled wires 1014 that is similar to the pair of terminal coiled wires 616 shown in FIG. 6B. The glow plug in FIG. 10A includes an angled sleeve 1006 and a ceramic insulator ring 1010 in addition to the elements of the glow plug 600. The angled sleeve 1006 is made of oxide ceramics which will be joined by a glass seal on the OD side. The ceramic insulator ring 1010 is made of alumina. Other components and working of the glow plug in FIG. 10A remain the same as that of the glow plug 600, and hence the corresponding description is omitted for the sake of brevity. FIG. 10B depicts an illustration of a glow plug (shown in FIG. 10A) with physical measurements (in mm) of the elements, in accordance with an embodiment of the present disclosure.

Figures 11A, 11B, 11C, 11D:
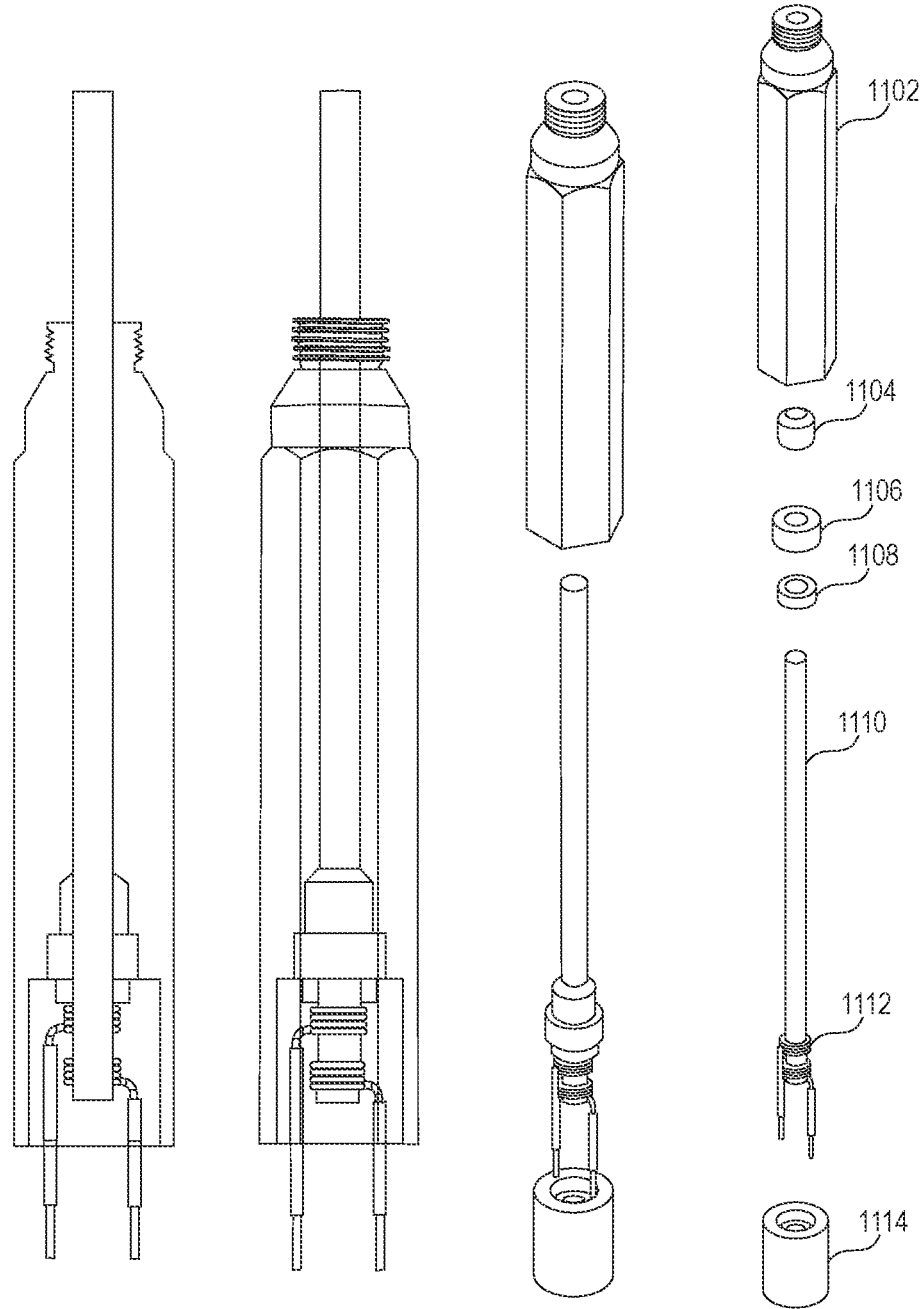
FIGS. 11A-11D illustrate different element views of the glow plug, in accordance with an embodiment of the present disclosure.

FIGS. 11A-11D illustrate different element views of a glow plug (similar to the glow plug shown in FIG. 10A), in accordance with an embodiment of the present disclosure. FIG. 11D illustrates all element exploded view inside the glow plug of FIG. 10A. FIG. 11D depicts a housing 1102, an angled sleeve 1104, a sealing element 1106, a ceramic insulator ring 1108, a heating element 1110, and a potting compound 1114 that are similar to a housing 1004, an angled sleeve 1006, a sealing element 1008, a ceramic insulator ring 1010, a heating element 1110, and a potting compound 1012 of FIG. 10A, respectively. Further, FIG. 11D depicts an electrical connection 1112 between a pair of terminal coiled wires and the heating element 1110.

Figures 12A, 12B:
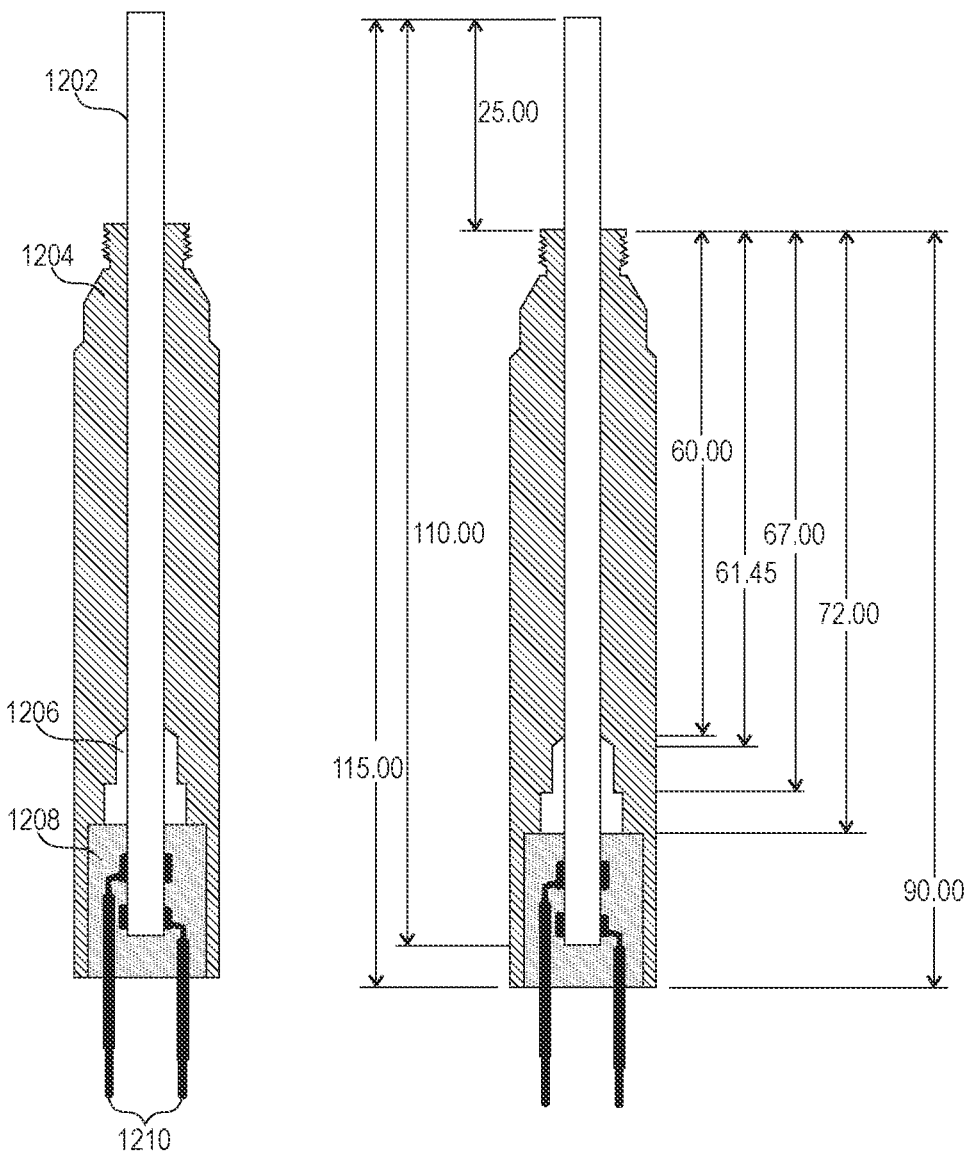
FIG. 12A illustrates elements of another glow plug, in accordance with an embodiment of the present disclosure.
FIG. 12B depicts an illustration of the glow plug with physical measurements (in mm) of the elements, in accordance with an embodiment of the present disclosure.

FIG. 12A illustrates elements of another glow plug, in accordance with an embodiment of the present disclosure. The glow plug, shown in FIG. 12A, is similar to the glow plug shown in FIG. 6B. The glow plug, shown in FIG. 12A, includes a pair of terminal coiled wires 1210 that is similar to the pair of terminal coiled wires 616 shown in FIG. 6B. The glow plug in FIG. 12A includes an angled sleeve sealant 1206 instead of the sealant 612 shown in FIG. 6B. The angled sleeve sealant 1206 is made of KOVAR. Other components and working of the glow plug in FIG. 12A remain the same as that of the glow plug 600, and hence the corresponding description is omitted for the sake of brevity. FIG. 12B depicts an illustration of a glow plug (shown in FIG. 12A) with physical measurements (in mm) of the elements, in accordance with an embodiment of the present disclosure.

Figures 13A, 13B, 13C, 13D:
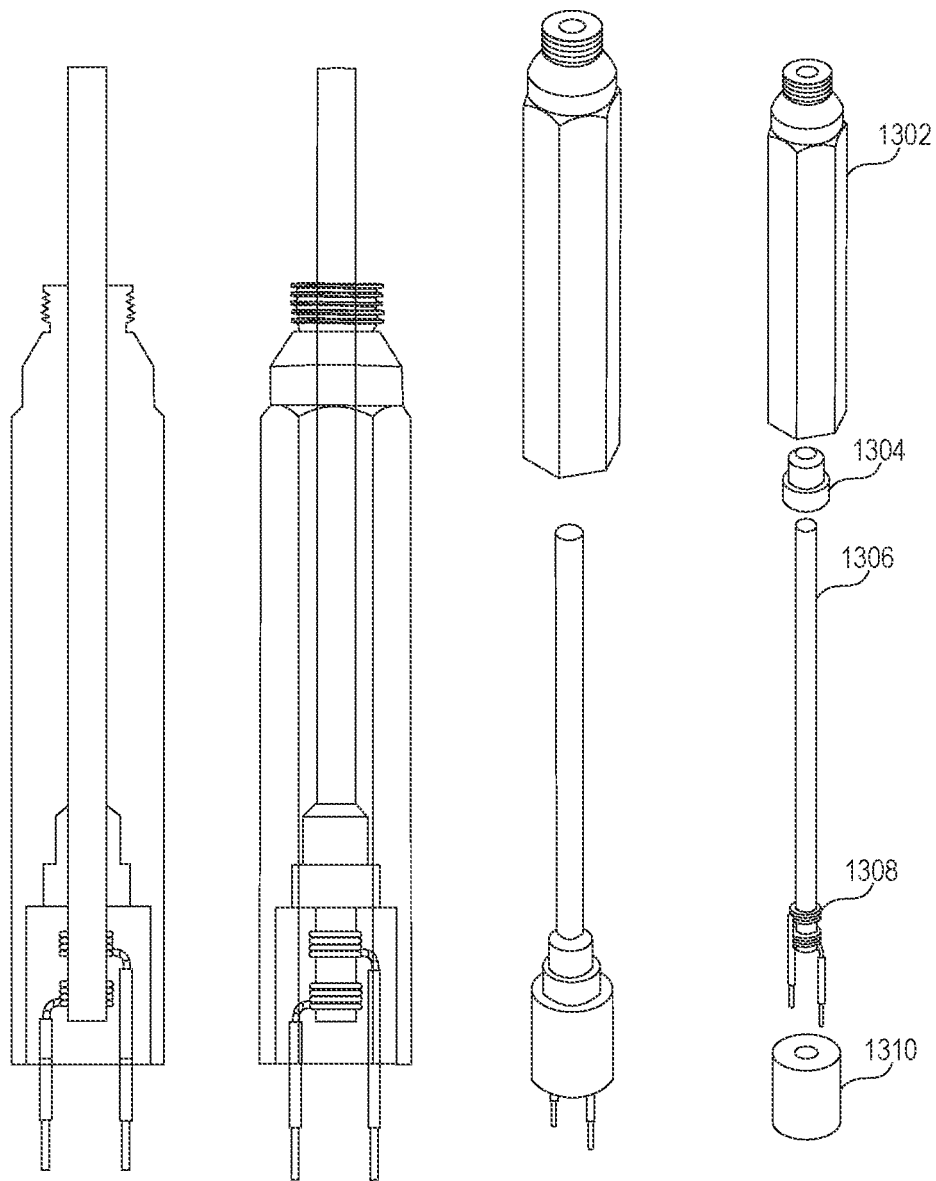
FIGS. 13A-13D illustrate different element views of the glow plug, in accordance with an embodiment of the present disclosure.

FIGS. 13A-13D illustrate different element views of a glow plug (similar to the glow plug shown in FIG. 12A), in accordance with an embodiment of the present disclosure. FIG. 13D illustrates all element exploded view inside the glow plug of FIG. 12A. FIG. 13D depicts a housing 1302, an angled sleeve sealing element 1304, a heating element 1306, and a potting compound 1310 that are similar to a housing 1204, an angled sleeve sealing element 1206, a heating element 1202, and a potting compound 1208 of FIG. 12A, respectively. The angled sleeve sealing element 1206, 1304 is of an angled sleeve-like structure. Further, FIG. 13D depicts an electrical connection 1308 between a pair of terminal coiled wires and the heating element 1306.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A glow plug for a solid oxide fuel cell system, the glow plug comprising:
   a housing having a first end portion and a second end portion;
   a heating element longitudinally disposed in the housing, extending from the second end portion of the housing towards the first end portion and extending outwardly from the housing for igniting fuel;
   a pair of coiled wires electrically connected to the heating element, the pair of coiled wires extending from the second end portion of the housing;
   a potting compound disposed within the second end portion of the housing for securing electrical coupling of the pair of coiled wires with the heating element;
   a sealing element configured to form an air-tight connection between the housing and the heating element, wherein the sealing element is positioned on a surface of the potting compound; and
   an insulator ring positioned in the potting compound.

2. The glow plug as claimed in claim 1, where the sealing element is of ring-like structure or angled sleeve structure.

3. The glow plug as claimed in claim 1, wherein the housing is made of austenitic nickel-chromium superalloy.

4. The glow plug as claimed in claim 1, wherein the sealing element is attached to the housing and the heating element by brazing.

5. A solid oxide fuel cell system, comprising:
   a glow plug comprising:
   a housing having a first end portion and a second end portion;
   a heating element longitudinally disposed in the housing, extending from the second end portion of the housing towards the first end portion and extending outwardly from the housing for igniting fuel;
   a pair of coiled wires electrically connected to the heating element, the pair of coiled wires extending from the second end portion of the housing;
   a potting compound disposed within the second end portion of the housing for securing electrical coupling of the pair of coiled wires with the heating element;

a sealing element configured to form an air-tight connection between the housing and the heating element, wherein the sealing element is positioned on a surface of the potting compound; and an insulator ring positioned in the potting compound.

* * * * *